United States Patent
Araya Moreno

(12) 
(10) Patent No.: US 8,944,441 B2
(45) Date of Patent: Feb. 3, 2015

(54) STEERING ASSEMBLY FOR A HUMAN-DRIVEN VEHICLE, AND HUMAN-DRIVEN VEHICLE

(75) Inventor: Fernando Esteban Araya Moreno, Barcelona (ES)

(73) Assignee: Inventias Engineering, S.L. (ES)

( * ) Notice: Subject to any disclaimer, the term of this patent is extended or adjusted under 35 U.S.C. 154(b) by 132 days.

(21) Appl. No.: 13/516,489

(22) PCT Filed: Dec. 15, 2010

(86) PCT No.: PCT/IB2010/003261
§ 371 (c)(1),
(2), (4) Date: Jun. 15, 2012

(87) PCT Pub. No.: WO2011/073776
PCT Pub. Date: Jun. 23, 2011

(65) Prior Publication Data
US 2012/0267867 A1   Oct. 25, 2012

(30) Foreign Application Priority Data
Dec. 16, 2009   (EP) ..................................... 09380187

(51) Int. Cl.
*B62B 3/14* (2006.01)
*B62B 3/00* (2006.01)
*B62D 39/00* (2006.01)

(52) U.S. Cl.
CPC ............. *B62B 3/001* (2013.01); *B62B 2205/14* (2013.01)
USPC ................... 280/33.992; 280/33.994; 280/43; 280/43.17

(58) Field of Classification Search
USPC ............... 280/43, 43.12, 43.17, 43.19–43.21, 280/43.23, 47, 33.992, 33.994, 761, 767, 280/33.991
See application file for complete search history.

(56) References Cited

U.S. PATENT DOCUMENTS

| | | | | |
|---|---|---|---|---|
| 1,940,523 A * | 12/1933 | Barclay | ....................... | 297/183.2 |
| 2,672,349 A * | 3/1954 | Brock | ......................... | 280/43.22 |
| 2,833,435 A * | 5/1958 | Levy | .............................. | 414/592 |
| 3,190,386 A * | 6/1965 | Swinny | ........................ | 180/19.2 |
| 3,380,546 A * | 4/1968 | Rabjohn | ......................... | 180/15 |
| 4,580,800 A * | 4/1986 | Upton et al. | ............. | 280/33.994 |
| 4,941,794 A * | 7/1990 | Hara et al. | .................... | 414/341 |
| 5,033,757 A * | 7/1991 | Lloyd | ..................... | 280/33.992 |

(Continued)

FOREIGN PATENT DOCUMENTS

| | | |
|---|---|---|
| EP | 1238885 A1 | 9/2002 |
| WO | 87/07830 A1 | 12/1987 |

*Primary Examiner* — J. Allen Shriver, II
*Assistant Examiner* — Travis Coolman
(74) *Attorney, Agent, or Firm* — Hess Patent Law Firm LLC; Robert J. Hess

(57) ABSTRACT

The steering assembly is applicable to a human-driven vehicle having a chassis (1) mounted on self-orienting wheels (2). The steering assembly comprises a steering unit (50*b*) with a steering wheel (4) installed on a mobile support and maintained out of contact with the ground by elastic means at an end (1*b*) of the chassis (1), and a control unit (50*a*) with a command member (7) in another end of the chassis. The units are connected by transmission devices (19, 20, 21). The command member (7) is manually operable to lower the steering wheel (4) against the force of said elastic means and to make the steering wheel (4) rotate with respect to a substantially vertical shaft when the wheel (5) is in contact with the ground to steer the vehicle. The elastic means automatically lift the steering wheel (4) when the manual operation of the command member (7) ceases.

13 Claims, 12 Drawing Sheets

(56) References Cited

U.S. PATENT DOCUMENTS

| | | | |
|---|---|---|---|
| 5,083,625 A * | 1/1992 | Bleicher | 180/65.1 |
| 5,348,326 A * | 9/1994 | Fullenkamp et al. | 280/43.17 |
| 5,628,522 A * | 5/1997 | Hall | 280/43.17 |
| 6,218,796 B1 * | 4/2001 | Kozlowski | 318/280 |
| 6,331,009 B1 * | 12/2001 | Wilkinson | 280/33.996 |
| 6,505,359 B2 * | 1/2003 | Heimbrock et al. | 5/86.1 |
| 6,792,630 B1 * | 9/2004 | Palmatier et al. | 5/86.1 |
| 7,198,279 B2 * | 4/2007 | Montalvo | 280/33.992 |
| 7,428,940 B2 * | 9/2008 | Raetze et al. | 180/169 |
| 7,445,215 B2 * | 11/2008 | Prather et al. | 280/33.994 |
| 7,562,883 B2 * | 7/2009 | Livengood et al. | 280/87.01 |
| 7,905,304 B2 * | 3/2011 | Adachi | 180/12 |
| 8,109,525 B2 * | 2/2012 | Salus | 280/43 |
| 8,167,061 B2 * | 5/2012 | Scheuerman et al. | 180/65.1 |
| 8,292,327 B2 * | 10/2012 | Araya Moreno et al. | 280/771 |
| 2007/0085285 A1 * | 4/2007 | Lindsay | 280/47.34 |
| 2007/0131465 A1 * | 6/2007 | Garceau | 180/65.5 |
| 2012/0007323 A1 * | 1/2012 | Janick et al. | 280/47.34 |

* cited by examiner

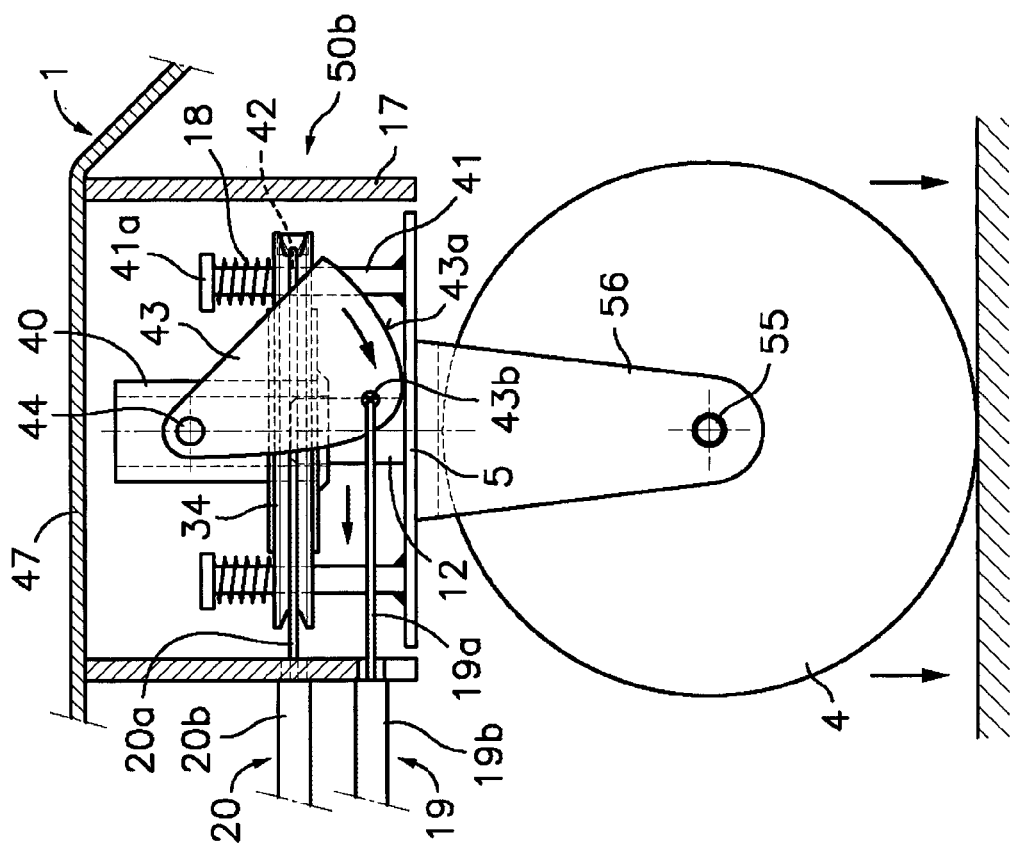
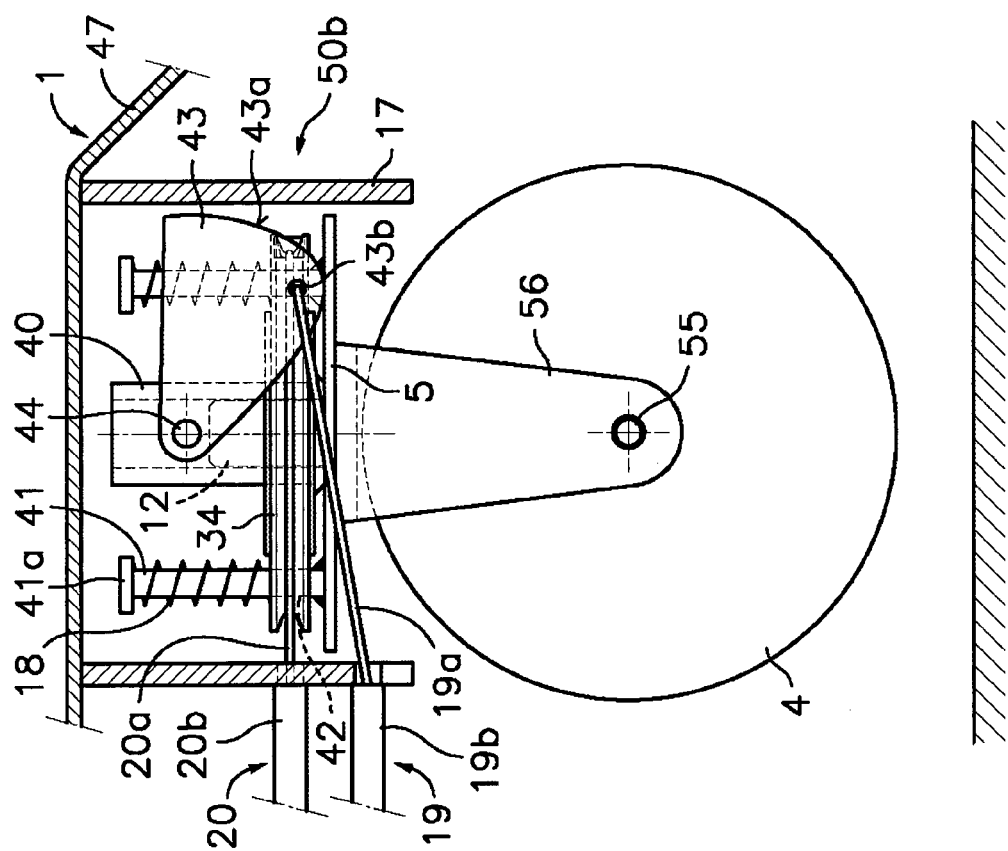

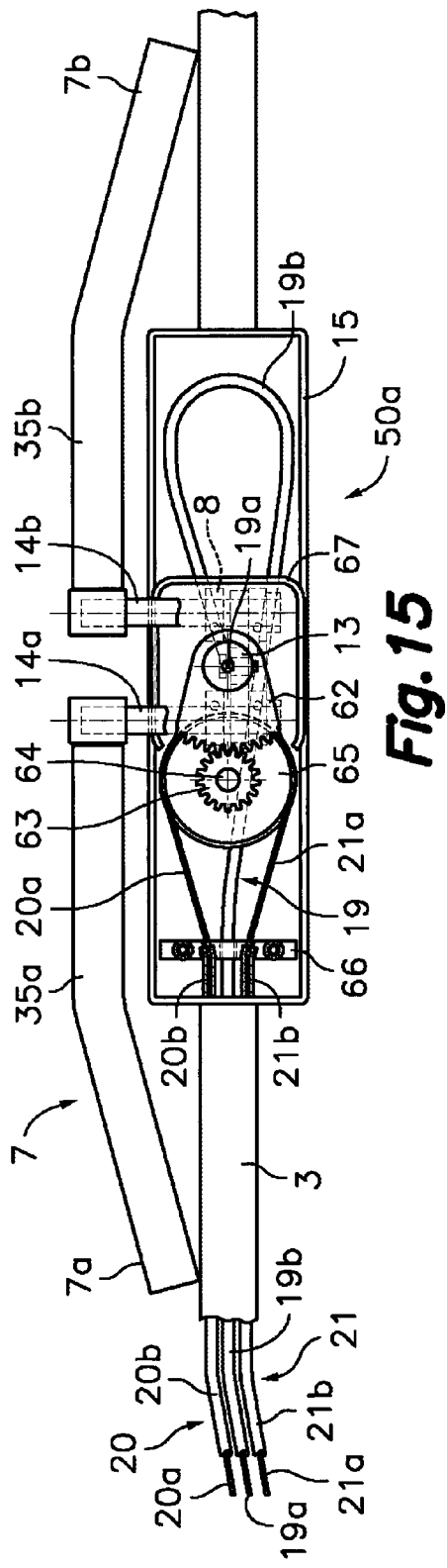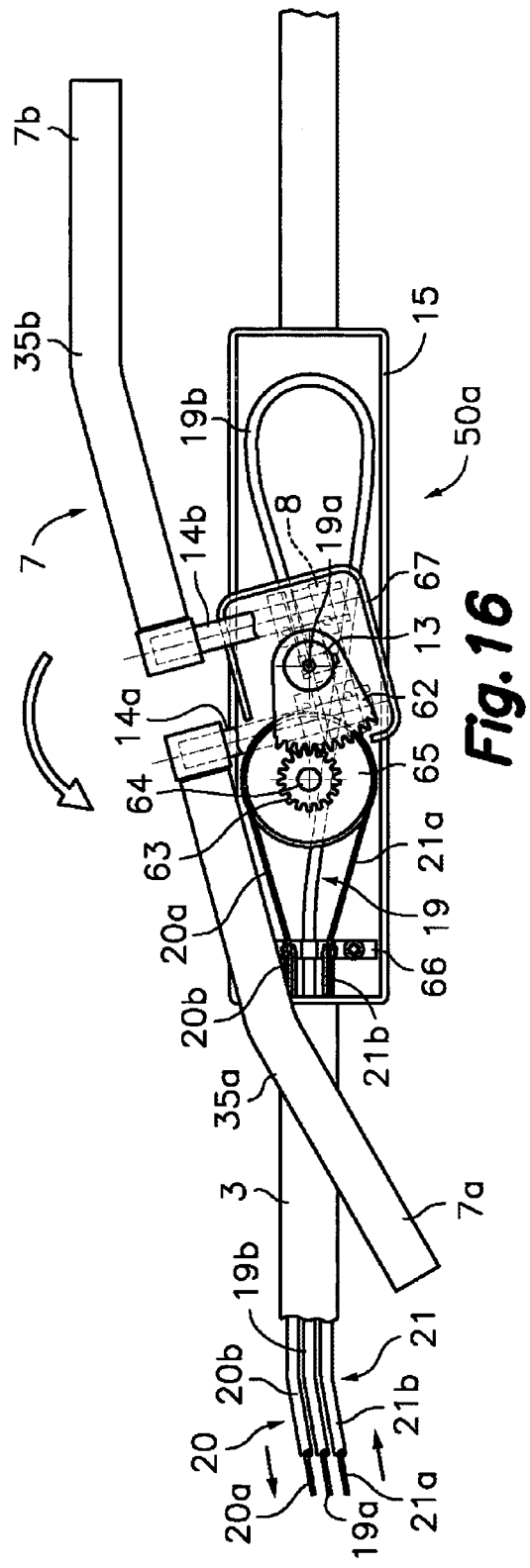

STEERING ASSEMBLY FOR A HUMAN-DRIVEN VEHICLE, AND HUMAN-DRIVEN VEHICLE

TECHNICAL FIELD

The present invention relates to a steering assembly applicable to a human-driven vehicle provided with self-orienting wheels, such as, for example, a shopping cart, a warehouse trolley, a hospital bed or cart, etc., for the purpose of providing the user with the possibility of performing a steering of said vehicle by means of a command member controlling an additional steering wheel. The present invention also relates to a human-driven vehicle provided with such device.

BACKGROUND OF THE INVENTION

International patent application WO-2006/037822-A1, belonging to the current applicant, discloses a device for steering a self-orienting wheel of a human-driven vehicle, where the self-orienting wheel to be guided is one of the wheels on which the vehicle moves in normal conditions. The operation of the device is based on providing a steering mechanism and a clutch mechanism which can optionally be operated to couple said steering mechanism to a rotating support on which the self-orienting wheel is mounted. The mentioned steering and clutch mechanisms are distributed in a control unit fixed, for example, to a push bar located in a rear end region of the vehicle, and a steering unit associated with the self-orienting wheel to be driven, which is located, for example, in a front end region of the vehicle. The partial mechanisms housed in the control and steering units are mutually connected by respective movement transmission devices, such as, for example, Bowden type flexible cable and sheath assemblies. Elastic means push the clutch mechanism towards an uncoupled position and the mentioned control unit includes a command member at the disposal of the user to remotely operate the clutch mechanism against the force of said elastic means and the steering mechanism.

The device of the mentioned international patent application WO-2006/037822-A1 is fully operative, although it has some aspects which can be improved. For example, the implementation of the clutch mechanism requires an adaptation to the self-orienting wheel to be driven and, due to the fact that there is a large variety of self-orienting wheel models, a specific design of part of the clutch mechanism is required for each model if the device is to be applied to a variety of pre-existing vehicles. Furthermore, the coupling of the clutch mechanism is only performed when the self-orienting wheel is in a predetermined angular position in relation to a coupling part of the clutch mechanism, which forces the user to perform a certain maneuver with the vehicle in addition to manually acting on the command member to carry out the coupling.

Document EP-1238885-A1 discloses a carriage provided with self-orienting wheels, which includes an additional steerable and power-driven wheel at an end of the carriage. The mentioned orientable wheel is mounted on a supported connected to a mechanism operated by means of a handle which allows lowering the support until putting the orientable wheel in contact with the ground, and raising the support to put the orientable wheel out of contact with the ground. The raising and lowering mechanism comprises a tubular column fixed to the chassis of the carriage and a slide bar inserted in said tubular column, where the support of the wheel is fixed to the lower end of the slide bar and the handle is installed at the upper end of the tubular column to rotate with respect to a horizontal axis and connected to the upper end of the slide bar by means of an eccentric mechanism. The handle can thus be shifted between a horizontal position and a vertical position to raise or lower the orientable wheel and can be rotated with respect to a vertical axis to vary the orientation of the orientable wheel. A locking mechanism allows locking the handle in the horizontal position.

A drawback of the carriage described in the mentioned document EP-1238885-A1 is that the control handle is located at the same end of the carriage where the orientable wheel is located, which is unsuitable for a human-driven vehicle, such as a shopping cart, where the most suitable situation for a steering wheel is the front end region of the vehicle while the vehicle is generally pushed by the user by means of a push bar or another resistant structure located in the rear end region of the vehicle.

DISCLOSURE OF THE INVENTION

The present invention provides a steering assembly for a human-driven vehicle, said vehicle having a chassis with a first end region and a second end region which are opposite to one another. The mentioned chassis is mounted on freely rotating wheels, where at least two of said wheels, which are located in said second end region, are self-orienting wheels. The steering assembly comprises an additional steering wheel installed on a wheel support in the second end region of the chassis, a manually operable lowering mechanism for moving said wheel support between a lifted position, in which said steering wheel is out of contact with the ground, and a lowered position, in which the steering wheel is in contact with the ground, and a manually operable steering mechanism for making the wheel support and with it the steering wheel rotate with respect to a steer shaft, which is in a substantially vertical position at least when the wheel support is in said lowered position, to steer the vehicle.

First elastic means are arranged to push the wheel support towards said lifted position, and to maintain it therein, and said lowering mechanism comprises a command member which can be manually operated to move the wheel support towards the lowered position against the force of said first elastic means. The mentioned lowering mechanism is configured to move, as a consequence of a manual operation of the command member, the wheel support towards the lowered position, and maintain it therein, against the force of said first elastic means. The first elastic means are arranged to return the wheel support to the lifted position when said manual operation of the command member ceases.

The mentioned command member is common for said lowering and steering mechanisms and is located in said first end region of the chassis, and the wheel support with the steering wheel is located in a second end region of the chassis opposite to said first end region. Respective first and second movement transmission devices are arranged to transmit movements from the command member to the wheel support.

Preferably, each of said lowering and steering mechanisms has a first part installed adjacent to the command member and connected thereto in said first end region of the chassis and a second part installed adjacent to the wheel support and connected thereto in the second end region of the chassis. The mentioned first and second parts of the lowering and steering mechanisms are connected to one another by said first and second movement transmission devices. The first parts of the lowering and steering mechanisms and said command member, which is common for both lowering and steering mechanisms, are integrated in a control unit configured to be fixed to a push member or to the chassis in the first end region so that the command member can be manually operated by a user to remotely perform the lowering and rotation movements of the wheel support from a position adjacent to said push member. The second parts of the lowering and steering mechanisms and the steering wheel are integrated in a steering unit configured to be fixed to the chassis in the second end region. These two control and steering units are interconnected by the mentioned first and second movement transmission devices, which are preferably formed by Bowden type flexible cable and sheath assemblies.

With this construction, the steering assembly of the present invention provides the possibility of performing an optional steering of a human-driven vehicle provided with self-orienting wheels using an additional steering wheel located at an end of the vehicle, advantageously the front end, by means of a command member located at the disposal of the user at the opposite end of the vehicle, advantageously the rear end where the push member or another push structure is located. This arrangement allows the user to push the vehicle from behind, as is usual, and at the same time control optionally and without an additional effort the direction of the front end of the vehicle. Furthermore, this arrangement also allows the optional control of the direction when the vehicle is pulled in an opposite direction.

The existence of the elastic means which automatically lift the steering wheel putting it out of contact with the ground when the user stops acting on the command member facilitates that the vehicle has the usual behavior provided by the self-orienting wheels, allowing side movements when the user does not act on the command member. The steering assembly of the present invention can be applied to human-driven vehicles of the type which can be nested in one another when they are not in use to reduce space, and the fact that the additional steering wheel is automatically placed in the lifted position by the mentioned elastic means assures the usual maneuverability of the plurality of nested vehicles when they are moved together.

The steering assembly of the present invention can be supplied as a kit to be incorporated to pre-existing vehicles without needing to modify or substitute the original wheels of the vehicle as a result of providing the additional steering wheel. Likewise, the steering assembly of the present invention can be easily integrated into the design of new human-driven vehicle models. In any case, the steering mechanism is permanently coupled to the support of the additional steering wheel and to make use of the optional guiding capacity it is enough to operate the lowering mechanism to put the steering wheel in contact with the ground, without needing any additional coupling maneuver as in prior art devices.

In a particular embodiment, the steering assembly of the invention is applicable to a shopping cart of the type including a substantially horizontal push member located in the first end region or rear region of the vehicle, said control unit is designed to be fixed directly to said push member or to the chassis in a position adjacent to the push member, and the command member has the form of a handlebar provided with capacity of rotation on two crossed axes, where the command member is positioned on one side of the push member facing the second end region or front region of the chassis and has a pair of grips located at a distance from the push member selected so that said grips of the command member can be operated with one or more fingers of each hand at the same time as the vehicle is pushed with the hands by means of the push member. In other words, the command member can be optionally operated when considered necessary without needing to let go of the push member. Nevertheless, the command member is not limited to the form of a handlebar and can adopt any other configuration, such as a lever or handle provided with capacity of rotation on two axes, allowing it to adapt to vehicles which do not have a push member.

The control unit comprises a base body which can be fixed to the push structure or member, or to the chassis of the vehicle. A coin-operated locking device is operatively housed in said base body to allow the immobilization of the vehicle with respect to another vehicle with a similar coin-operated locking device, or with respect to an anchoring point fixed in relation to the ground.

BRIEF DESCRIPTION OF THE DRAWINGS

The previous and other features and advantages will be more fully understood from the following detailed description of several embodiments with reference to the attached drawings, in which:

FIG. 11 is a cross-sectional view of a steering unit according to an alternative embodiment taken through a vertical mid-plane, where the steering wheel is in the lifted position;

FIG. 12 is a cross-sectional view of the steering unit of FIG. 11 taken through a vertical mid-plane, where the steering wheel is in the lowered position;

FIG. 15 is a top view of the control unit of FIG. 13, with some parts sectioned, where the command member is in a neutral position corresponding to the straight position of the steering wheel of the steering unit shown in FIG. 9; and FIG. 16 is a top view of the control unit of FIG. 13, with some parts sectioned, where the command member is in a rotated position corresponding to the rotated position of the steering wheel of the steering unit shown in FIG. 10.

DETAILED DESCRIPTION OF EXEMPLARY EMBODIMENTS

Figure 1:
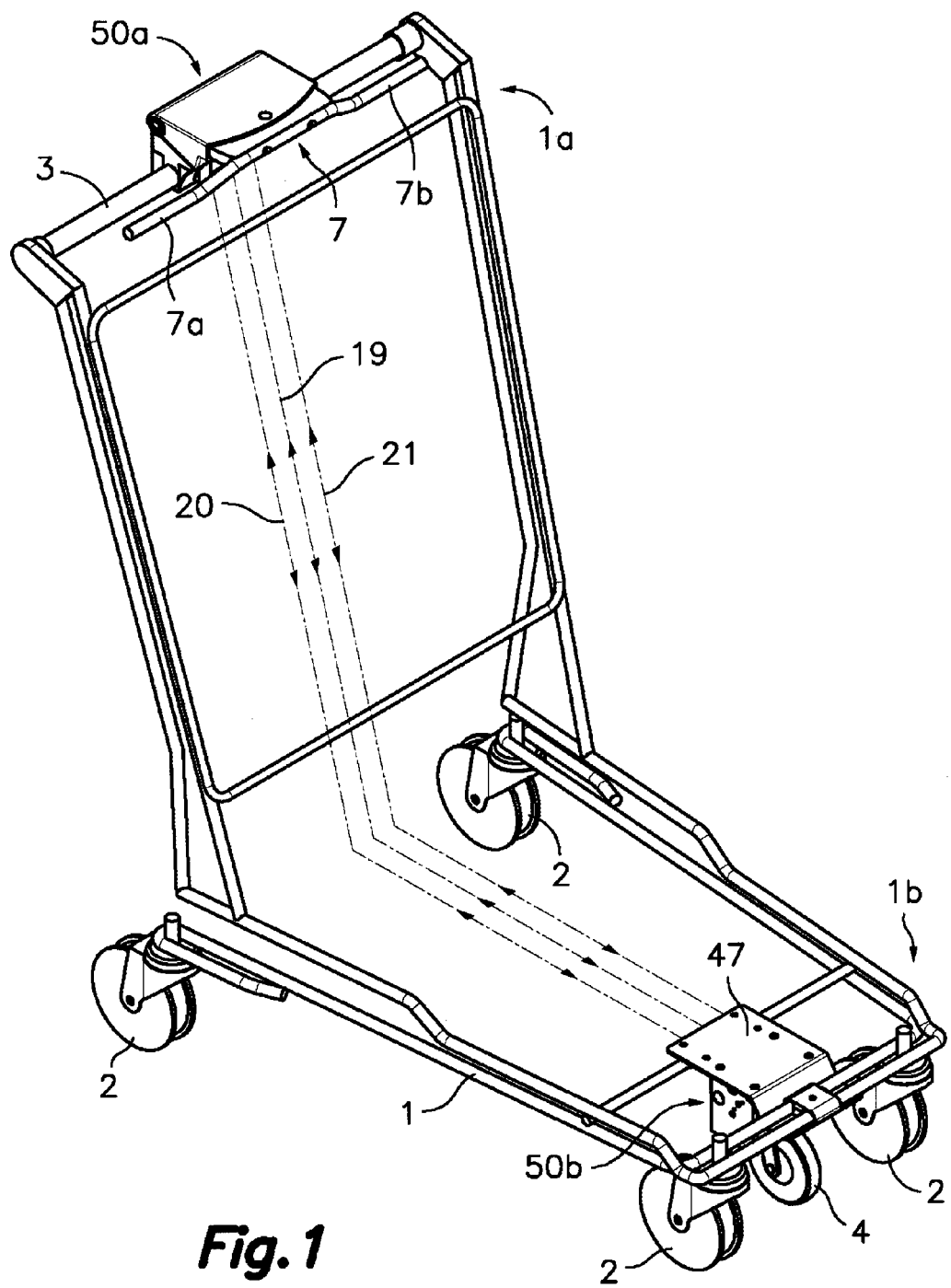
FIG. 1 is a perspective view of a steering assembly according to an embodiment of the present invention applied to a chassis of a human-driven vehicle exemplified by a shopping cart.

With reference first to FIG. 1, it generally shows a chassis of a human-driven vehicle to which a steering assembly according to an embodiment of the present invention is applied. The mentioned vehicle shown in FIG. 1 is exemplified by a shopping cart having a chassis 1 with a first end region 1a and a second end region 1b, which are opposite to one another. According to a forward movement direction of the vehicle in usual conditions the mentioned first and second end regions 1a, 1b correspond to a rear end region and a front end region, respectively. The chassis 1 is mounted on four freely rotating wheels 2, two of them located in the first end region 1a and the other two in the second end region 1b. In the shopping cart shown in FIG. 1 the four wheels are self-orienting wheels 2, although for the purposes of the present invention it is only essential for the wheels located in the second end region 1b to be self-orienting wheels 2. The chassis 1 of the shopping cart shown in FIG. 1 further includes a push structure in the form of a substantially horizontal push member 3 fixedly joined to the chassis 1 in the first end region 1a, such that a user can manually push said push member 3 to make the cart move forwards, and the steering assembly of the embodiment shown is configured to be applied to such shopping cart provided with push member 3. It must be taken into account, however, that the steering assembly of the present invention could alternatively be configured to be applied to any type of human-driven vehicle provided with another type of push structure.

In general terms, the steering assembly of the present invention comprises a fifth wheel or steering wheel 4 installed on a wheel support 5 (better shown in FIGS. 5, 6 and 9-11) in the second end region 1b of the chassis 1, a lowering mechanism which can be manually operated to move said wheel support 5 between a lifted position (FIGS. 5 and 11), in which said steering wheel 4 is out of contact with the ground, and a lowered position (FIGS. 6 and 12), in which the steering wheel 4 is in contact with the ground; and a steering mechanism which can be manually operated to make the wheel support 5 and with it the steering wheel 4 rotate with respect to a steer shaft 12, which is in a substantially vertical position at least when the wheel support 5 is in said lowered position, to steer the vehicle. Each of said lowering and steering mechanisms has a first part installed in association with a command member 7 in said first end region 1a of the chassis 1 and a second part installed in association with the wheel support 5 and the steering wheel 4 in the second end region 1b of the chassis 1. The mentioned first and second parts of the lowering and steering mechanisms are connected to one another by respective first and second movement transmission devices 19, 20, 21 (symbolically depicted in FIG. 1).

The mentioned command member 7 is capable of performing combined rotation movements on two axes and serves both for the lowering mechanism and for the steering mechanism, such that the command member 7 can be manually operated by a user to remotely perform the lowering and rotation movements of the wheel support 5 and steering wheel 4 from a position adjacent to said push structure or push member 3. The steering assembly comprises first elastic means (which will be described in detail below) arranged to push the wheel support 5 towards said lifted position and maintain it therein. The lowering mechanism is configured to move, as a consequence of a manual operation thereof, the wheel support 5 towards the lowered position, and maintain it therein, against the force of said first elastic means. Therefore, when the mentioned manual operation of the lowering mechanism ceases, the first elastic means automatically return the wheel support 5 to the lifted position. Furthermore, the command member can be manually operated to perform variation movements in the orientation of the wheel support 5 and steering wheel 4 while the wheel support 5 is maintained in the lowered position to steer the vehicle.

The first parts of the lowering and steering mechanisms together with the command member 7 are integrated in a control unit 50a configured to be fixed to the push structure or to the chassis 1 in the first end region 1a, and the second parts of the lowering and steering mechanisms together with the steering wheel 4 are integrated in a steering unit 50b configured to be fixed to the chassis 1 in the second end region 1b. In the embodiment shown in the figures, the mentioned control unit 50a is configured to be fixed to the push member 3 and the command member 7, which has the form of a handle-bar formed by an elongated rigid body 35 provided with a pair of grips 7a, 7b at its opposite ends, is positioned on one side of the push member 3 facing the front region or second end region 1b of the chassis 1. When the control unit 50a is fixed in an operative position, the grips 7a, 7b of the command member are located at a suitable distance from the push member 3 so that they can be operated with one or more fingers of each hand at the same time as the vehicle is pushed with the palms and the thumbs of the hands on the push member 3. Alternatively, the control unit 50a could be fixed to the chassis 1 in a position adjacent to the push member 3 such that the grips 7a, 7b were in the position described in relation to the push member 3. In human-driven vehicles without a push member, the control unit 50a could be fixed in the corresponding push structure or in the chassis 1 close to the push structure and the command member 7 could have a form different from a handlebar.

Figure 2:
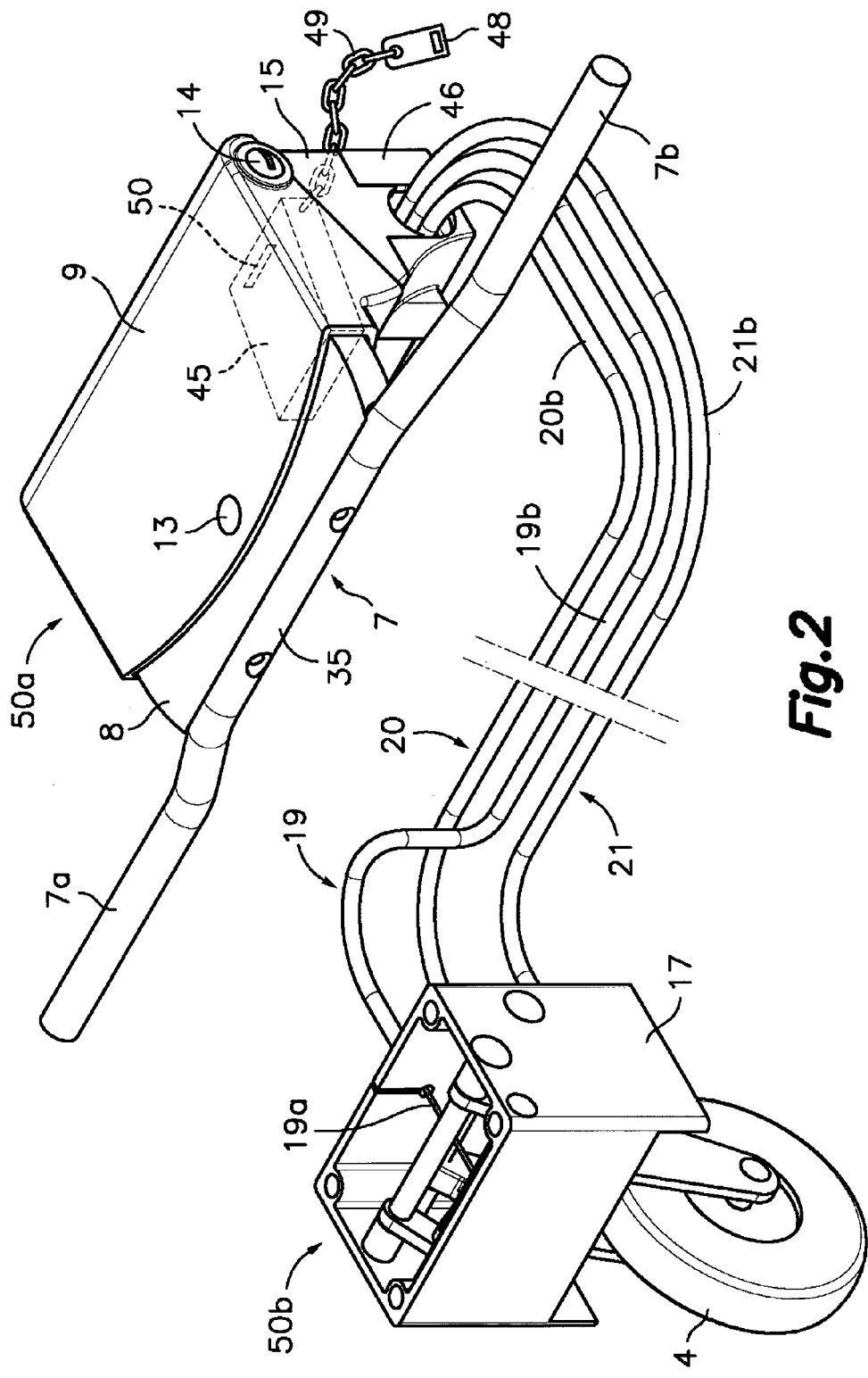
FIG. 2 is a perspective view of a control unit and a steering unit mutually connected by flexible movement transmission devices form the steering assembly of FIG. 1.

FIG. 2 separately shows the control unit 50a and the steering unit 50b interconnected by said first and second movement transmission devices 19, 20, 21, which are formed by Bowden type flexible cable and sheath assemblies 19a, 19b; 20a, 20b; 21a, 21b. The control unit 50a comprises a first base body 15 configured to be fixed to the upper side of the push member 3 by means of a lower clamp part 46 (see also FIGS. 3 and 4). The elongated rigid body 35 forming the command member 7 has an intermediate portion between the grips 7a, 7b fixed to a steering control support 8, which is mounted such that it can rotate with respect to a substantially vertical steering control shaft 13 supported in a lowering control support 9. The mentioned lowering control support 9 is in turn mounted such that it can rotate with respect to a lowering control shaft 14 which is substantially horizontal and substantially parallel to the longitudinal direction of the elongated rigid body 35, said lowering control shaft 14 being supported in said first base body 15. Thus, the command member 7 is provided with combined rotation movements on two crossed axes, namely; the axes of the steering control shaft 13 and the lowering control shaft 14. Optionally, in the first base body 15 of the control unit 50*a* there is operatively housed a coin-operated locking device 45 for allowing the immobilization of the vehicle with respect to another vehicle with a similar coin-operated locking device, or with respect to an anchoring point fixed in relation to the ground. The mentioned coin-operated locking device 45 can be of a commercially available conventional type comprising an anchoring part 48 secured by a chain 49 or another flexible element, an anchoring slot (not shown) for the introduction of a similar anchoring part secured to an adjacent cart or to a fixed anchoring point, a mechanism for immobilizing said anchoring part 48 in said anchoring slot, and a coin slot 51 for the introduction of a coin releasing said immobilization mechanism. The steering unit 50*b* comprises a second base body 17 configured to be fixed, for example, to the lower side of a plate 47 (FIG. 1) joined to the chassis 1.

Figure 3:
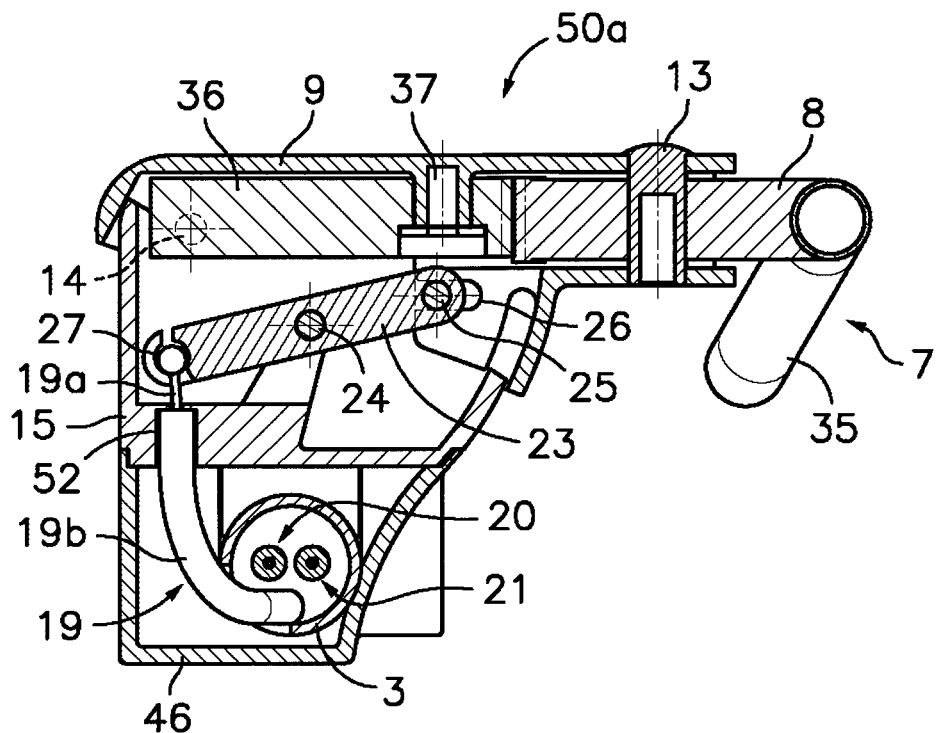
FIG. 3 is a cross-sectional view of the control unit taken through a vertical mid-plane, where a command member is in an inactive position corresponding to the lifted position of a steering wheel of the steering unit shown in FIG. 5 or in FIG. 11.
Figure 4:
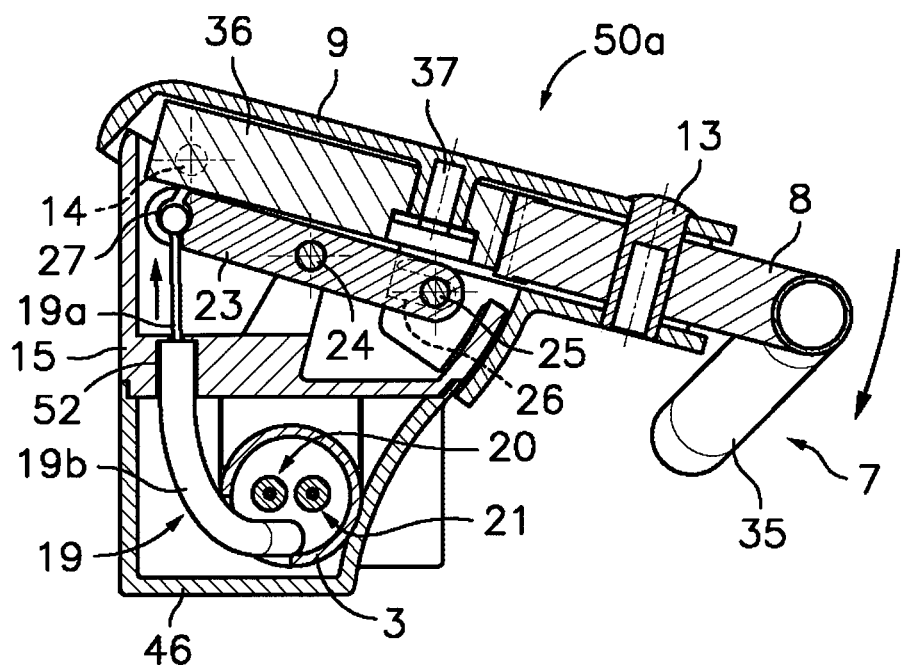
FIG. 4 is a cross-sectional view of the control unit taken through a vertical mid-plane, where the command member is in an active position corresponding to the lowered position of the steering wheel of the steering unit shown in FIG. 6 or in FIG. 12.

FIGS. 3 and 4 show a cross-sectional view of the control unit 50*a* with the command member 7 fixed to the steering control support 8, which is rotationally installed on the lowering control support 9, which is in turn mounted such that it can rotate with respect to said lowering control shaft 14 supported in the first base body 15. Between the steering control support 8 and the lowering control support 9 of the control unit 50*a* there are arranged second elastic means 22*a*, 22*b* to push the steering control support 8 and the command member 7 fixed thereto towards a neutral position corresponding to a straight orientation of the driving wheel 4. The mentioned first part of the lowering mechanism housed in the control unit 50*a* comprises a lowering lever 23 mounted to rotate in its middle part with respect to a pin 24 supported in the first base body 15. This lowering lever 23 has an end provided with a pin 25 inserted to run in a guided manner in a guide slot 26 formed in the lowering control support 9 and another opposite end provided with a first engagement configuration 27 for engaging a first end of the cable 19*a* of the first movement transmission device 19, whereas a first end of the sheath 19*b* of the first movement transmission device 19 is retained in a housing 52 of the first base body 15. Thus, a manually applied downward force on the control member 7 makes the lowering control support 9 rotate about the lowering control shaft 14, and the lowering control support 9 in turn makes the lowering lever 23 rotate about the pin 24, and the lowering lever 23 pulls on the first end of the cable 19*a* of the first movement transmission device 19, as shown in FIG. 4. In other words, the first part of the lowering mechanism arranged in the control unit 50*a* is capable of transforming a rotation of the lowering control support 9 with respect to the lowering control shaft 14 into an axial movement of the cable 19*a* of said first movement transmission device 19.

Figure 6:
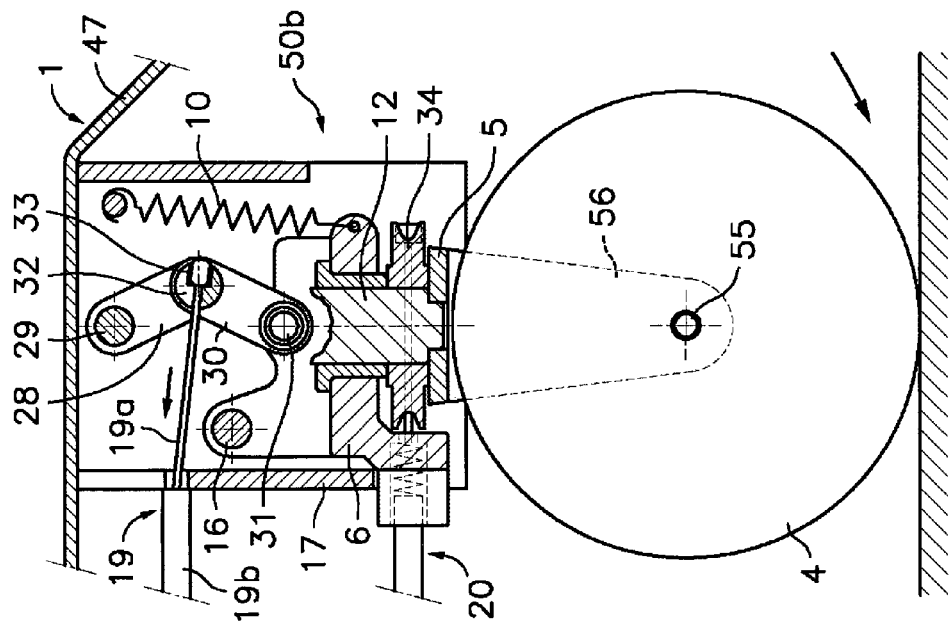
FIG. 6 is a cross-sectional view of the steering unit taken through a vertical mid-plane, where the steering wheel is in the lowered position corresponding to the active position of the command member of the control unit shown in FIG. 4.
Figure 5:
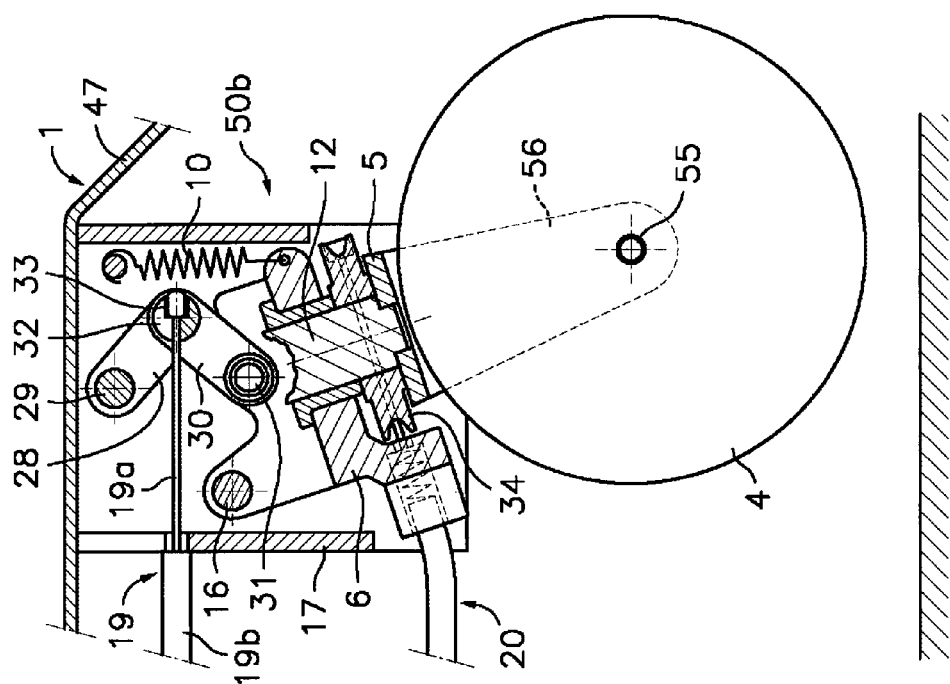
FIG. 5 is a cross-sectional view of the steering unit taken through a vertical mid-plane, where the steering wheel is in the lifted position corresponding to the inactive position of the command member of the control unit shown in FIG. 3.

With reference now to FIGS. 5 and 6, the second part of the lowering mechanism integrated in the steering unit 50*b* is described, which is configured and arranged to transform the movement of the first movement transmission device 19 into a pivoting of the rocker support 6 with respect to said first substantially horizontal shaft 16 and thus move the wheel support 5 to said lowered position, in which the steering wheel 4 is in contact with the ground, against the force of the first elastic means. The second base body 17 of the steering unit 50*b* supports a substantially horizontal rocking shaft 16 with respect to which a rocker support 6 can pivot. This rocker support 6 in turn supports the mentioned steer shaft 12 with respect to which the wheel support 5 can rotate, where the wheel support 5 has the steering wheel 4 mounted such that it can rotate with respect to a wheel shaft 55 supported in a yoke 56. The mentioned first elastic means comprise a coil spring 10 arranged under traction between the rocker support 6 and said second base body 17 of the steering unit 50*b* to maintain the rocker support 6, the wheel support 5 and the steering wheel 4 in the lifted position shown in FIG. 5. The second part of the lowering mechanism arranged in the steering unit 50*b* comprises an articulated arm having a first member 28 mounted to pivot with respect to a first pin 29 supported in the second base body 17 of the steering unit 50*b* and a second member 30 mounted to pivot with respect to a second pin 31 supported in the rocker support 6. The mentioned first and second members 28, 30 are articulately connected to one another by means of a third pin 32, and said articulated arm includes a second engagement configuration 33, formed for example in said third pin 32, for engaging a second end of said cable 19*a* of the first movement transmission device 19, whereas a second end of the sheath 19*b* of the first movement transmission device 19 is retained against a wall of the second base body 17. Thus, the second part of the lowering mechanism arranged in the steering unit 50*b* is capable of transforming the mentioned axial movement of the cable 19*a* of the first movement transmission device 19, caused by an action of the first part of the lowering mechanism arranged in the control unit 50*a* (FIG. 4) into a pivoting movement of the rocker support 6 about the rocking shaft 16 to take the wheel support 5 to the lowered position, in which the steering wheel 4 is in contact with the ground, against the force of the first elastic means (FIG. 6).

Figure 7:
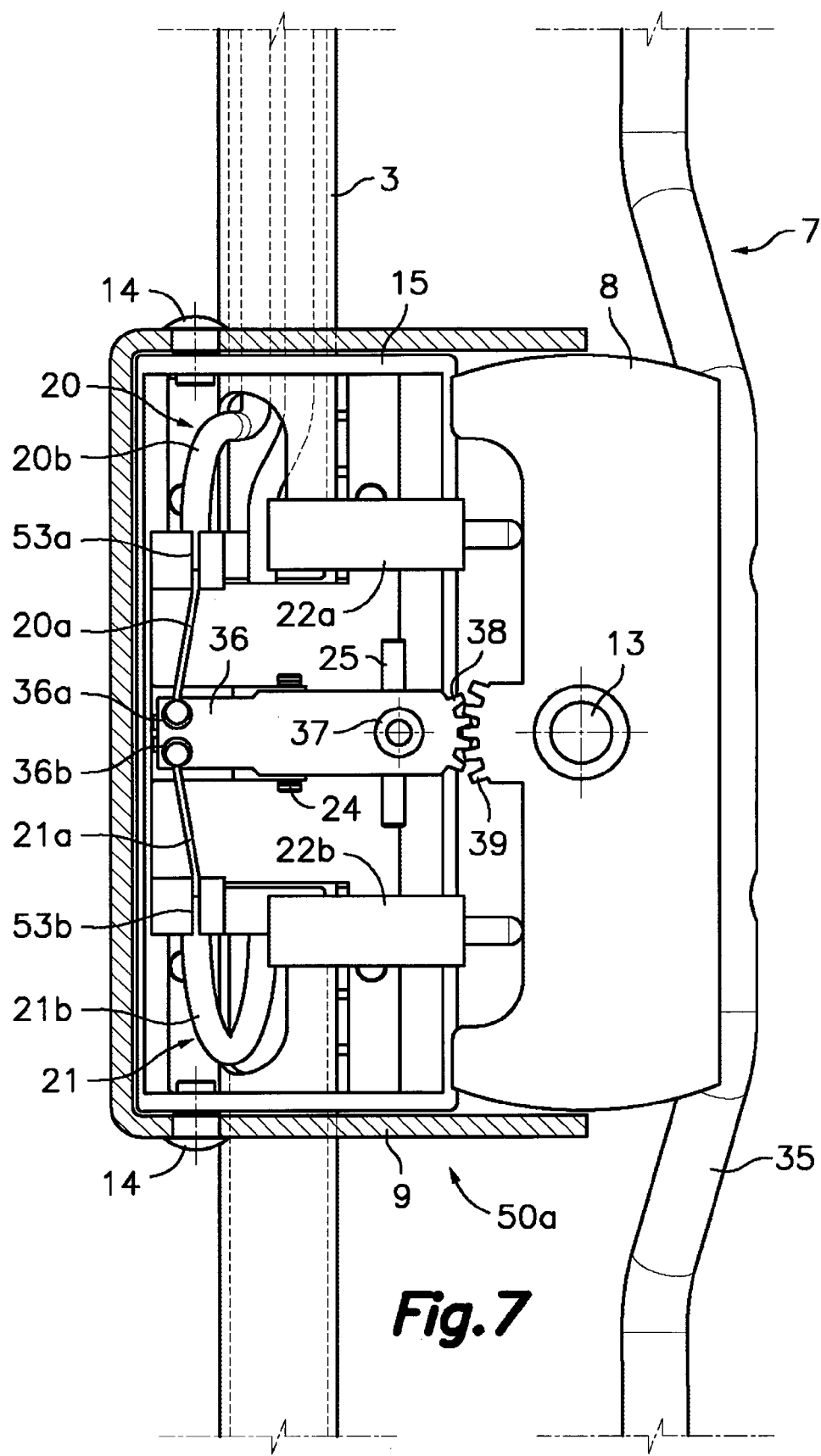
FIG. 7 is a top view of the control unit with some parts sectioned, where the command member is in a neutral position corresponding to the straight position of the steering wheel of the steering unit shown in FIG. 9.
Figure 8:
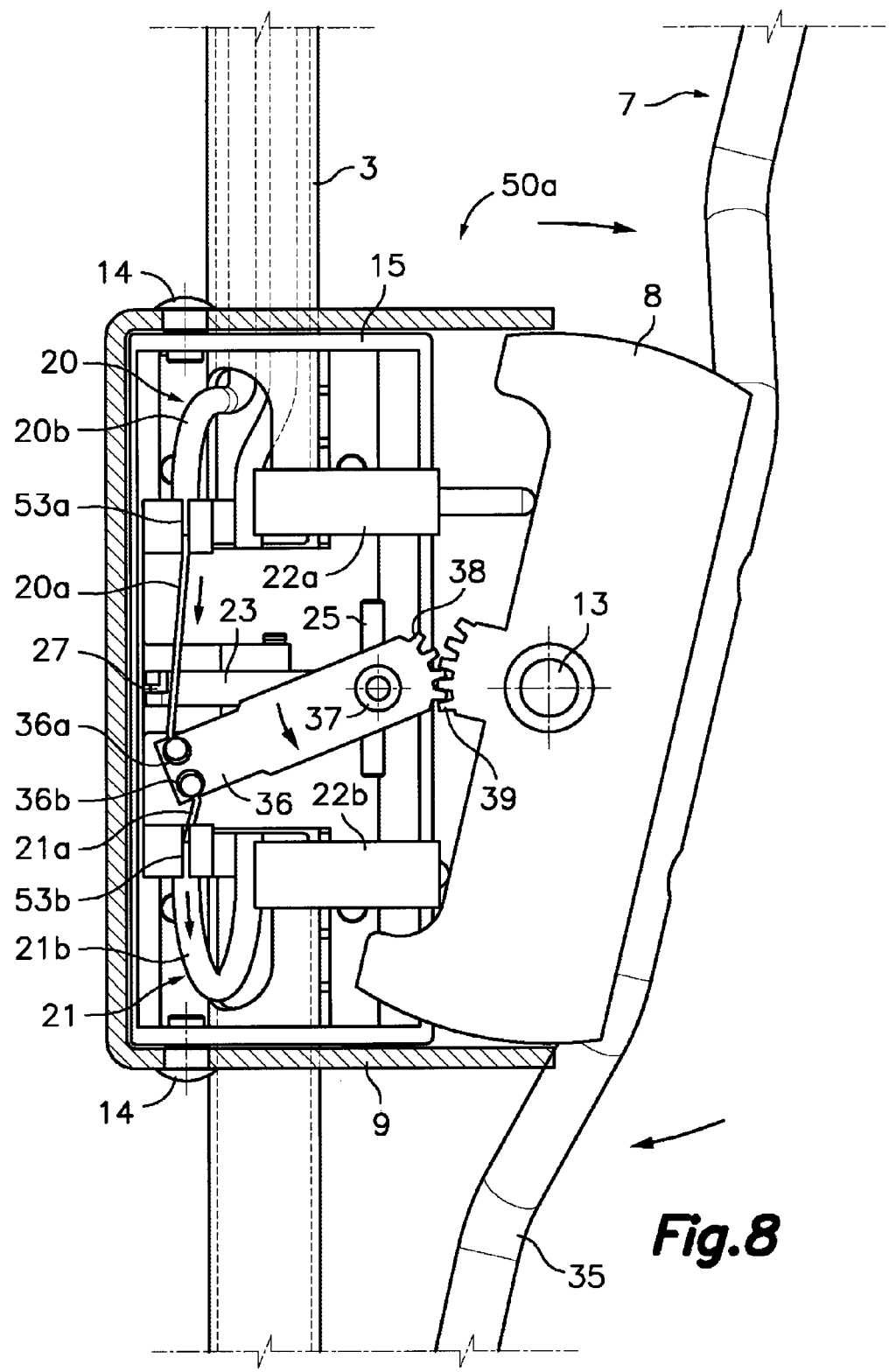
FIG. 8 is a top view of the control unit with some parts sectioned, where the command member is in a rotated position corresponding to the rotated position of the steering wheel of the steering unit shown in FIG. 10.

FIGS. 7 and 8 depict top views of the control unit 50*a* without the lowering control support 9 to better show the first part of the steering mechanism, which comprises a steering lever 36 mounted such that it can rotate with respect to a shaft 37 supported in the lowering control support 9 (see FIGS. 3 and 4). This steering lever 36 has a first end in which there is formed a first gear wheel sector 38 concentric with said shaft 37. The mentioned first gear wheel sector 38 is meshed with a second gear wheel sector 39 formed in the steering control support 8, this second gear wheel sector 39 being concentric with the steering control shaft 13, which is likewise supported in the lowering control support 9 (see FIGS. 3 and 4). A second end of the steering lever 36 comprises a first pair of engagement configurations 36*a*, 36*b* for engaging first ends of two cables 20*a*, 21*a* forming part of the second movement transmission device 20, 21, whereas first ends of the respective sheaths 20*b*, 21*b* of the second movement transmission device 20, 21 are retained in respective housings 53*a*, 53*b* formed in the first base part 15. Thus, the first part of the steering mechanism integrated in the control unit 50*a* is configured and arranged to transform the rotations of the steering control support 8 with respect to said steering control shaft 13 into axial movements of the cables 20*a*, 21*a* of said second movement transmission device 20, 21.

Figure 9:
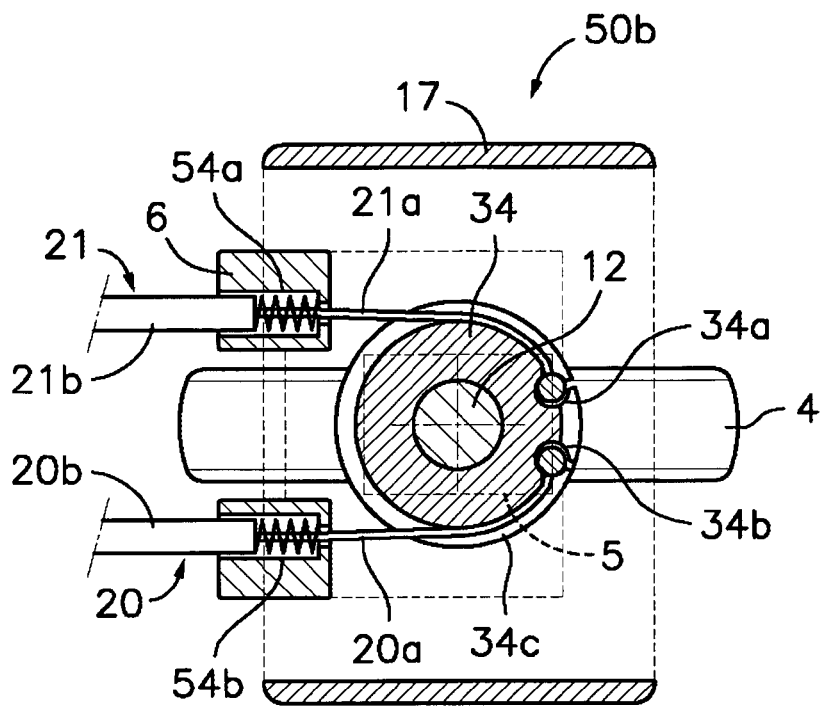
FIG. 9 is a top view of the steering unit with some parts sectioned, where the steering wheel is in a straight position corresponding to the neutral position of the command member of the control unit shown in FIG. 7.
Figure 10:
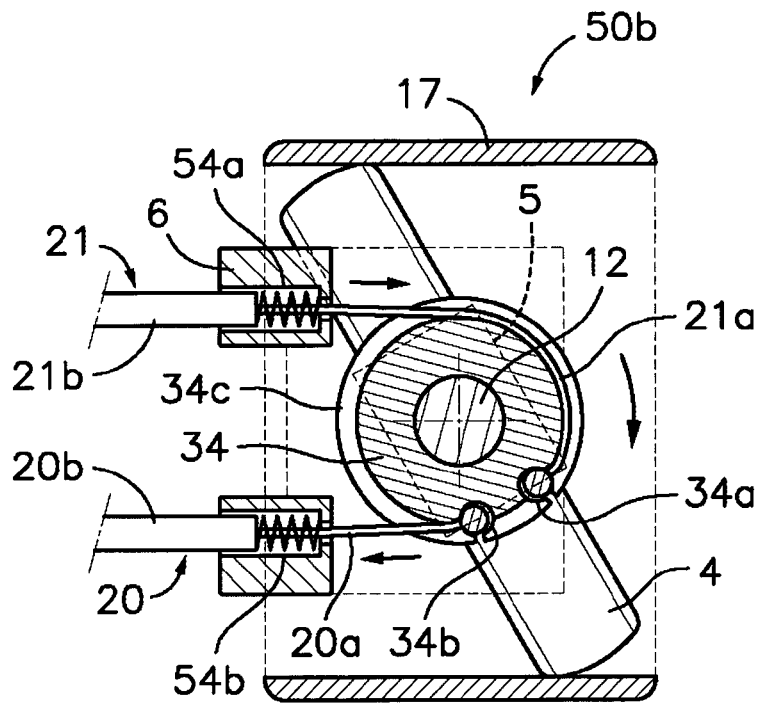
FIG. 10 is a top view of the steering unit with some parts sectioned, where the steering wheel is in a rotated position corresponding to the rotated position of the command member of the control unit shown in FIG. 8.

In relation to FIGS. 9 and 10, the second part of the steering mechanism integrated in the steering unit 50*b* is described below, which is configured and arranged to transform said axial movements of said cables 20*a*, 21*a* of the second movement transmission device 20, 21 into rotations of the wheel support 5 with respect to said steer shaft 12, to thus vary the orientation of the steering wheel 4 and steer the vehicle. This second part of the steering mechanism comprises a pulley 34 fixed to the wheel support 5 to rotate together with the wheel support 5 about the steer shaft 12. The mentioned pulley 34 comprises a second pair of engagement configurations 34*a*, 34*b* for engaging second ends of the cables 20*a*, 21*a* of the second movement transmission device 20, 21 and a circumferential groove 34c on which portions of said cables 20a, 21a of the second movement transmission device 20, 21 are supported. Second ends of the sheaths 20b, 21b of the second movement transmission device 20, 21 are retained in respective housings 54a, 54b of the rocker support 6, optionally in cooperation with elastic means.

The steering mechanism is preferably a multiplier mechanism, i.e., an angle rotated by the command member 7 with respect to the steering control shaft 13 is smaller than an angle rotated by the wheel support 5 with respect to the steer shaft 12. Thus, a user can steer the vehicle with slight movements of the fingers without letting go of the push member 3. In the embodiment shown in FIGS. 2 to 10, the mentioned multiplier effect is achieved by suitably selecting the radii of said first and second gear wheel sectors 38, 39 (FIGS. 7 and 8), the distances from said first pair of engagement configurations 36a, 36b of the steering lever 36 to the corresponding shaft 37 (FIGS. 7 and 8) and the distances from said second pair of engagement configurations 34a, 34b of the pulley 34 to the steer shaft 12 (FIGS. 9 and 10).

FIGS. 11 and 12 show an alternative embodiment for the second part of the steering mechanism integrated in the steering unit 50b, which is configured and arranged to transform the movement of the first movement transmission device 19 into a linear translation of the wheel support 5 with respect to said shaft support 40 to the lowered position, in which the steering wheel 4 is in contact with the ground, against the force of the first elastic means. Here, the wheel support 5 is linked to a linear guide arrangement such that it can slide in a direction parallel to the steer shaft 12 with respect to a shaft support 40 supporting the steer shaft 12. The mentioned shaft support 40 is supported in the second base body 17 of the steering unit 50b, and said second base body 17 is configured to be fixed to the chassis 1.

In this alternative embodiment for the second part of the steering mechanism, the pulley 34 is mounted on the shaft support 40 such that it can rotate about but not slide along the steer shaft 12, and drive rods 41 parallel to the steer shaft 12 are fixed to the wheel support 5 and slidingly inserted in corresponding holes 42 formed in the pulley 34. The first elastic means here comprise coil springs 18 arranged around said drive rods 41 such that they can be compressed between end stops 41a of the drive rods 41 and the pulley 34. A rotation of the pulley 34 as a consequence of the action of the second movement transmission device 20, 21 is transmitted to the wheel support 5 by the drive rods 41 whatever the position of the wheel support 5 in the vertical direction. In this alternative embodiment, the second part of the lowering mechanism comprises a cam 43 mounted such that it can rotate with respect to a shaft 44 supported in the second base body 17 of the steering unit 50b. The mentioned cam 43 is provided with an eccentric profile 43a arranged to press against the wheel support 5 and a second engagement configuration 43b for engaging a second end of the cable 19a of the first movement transmission device 19.

FIGS. 13 to 16 show an alternative embodiment for the first parts of the lowering and steering mechanisms integrated in the control unit 50a. In this alternative embodiment, the command member 7 comprises two elongated rigid bodies 35a, 35b, each of which has a grip 7a, 7b at a distal end and is fixed at an opposite proximal end to a corresponding lowering control shaft 14a, 14b which is substantially horizontal and substantially perpendicular to the longitudinal direction of the elongated rigid body 35a, 35b. These lowering control shafts 14a, 14b are mutually parallel and are supported such that they can rotate on a steering control support 8, which is fixed to a steering control shaft 13. The mentioned steering control shaft 13 is supported such that it can rotate in a substantially vertical position on a first base body 15 of the control unit 50a, which is configured to be fixed to the push member 3 of the chassis 1, although alternatively said first base body 15 could be fixed to the chassis 1 in a position adjacent to the push member 3.

With this construction, the two elongated rigid bodies 35a, 35b forming the command member 7 can be manually rotated in opposite directions about the respective lowering control shafts 14a, 14b between lifted positions (FIG. 13) and lowered positions (FIG. 14), and the command member 7 together with the steering control support 8 can be manually rotated in opposite directions about the steering control shaft 13 between a neutral position (FIG. 15) and positions rotated to the left (FIG. 16) and to the right (not shown).

The first part of the lowering mechanism of this alternative embodiment comprises a pair of first gear wheel sectors 60a, 60b fixed respectively to the lowering control shafts 14a, 14b and meshed with respective racks 61a, 61b formed on opposite sides of a traction element 61 installed such that it can move in a vertical direction with respect to the steering control support 8. The mentioned traction element 61 is fixed to a first end of the cable 19a of the first movement transmission device 19. The steering control shaft 13 has an inner cavity and a side opening 13a through which the cable 19a and the sheath 19b of the first movement transmission device 19 are introduced. In a wall of the upper end of the steering control shaft 13 there is formed an axial hole through which the cable 19a passes, whereas the sheath 19b is retained by said wall of the upper end of the steering control shaft 13. The steering control support 8, the lowering control shafts 14a, 14b, the gear wheel sectors 60a, 60b and the traction element 61 are protected by a casing 67.

Figure 13:
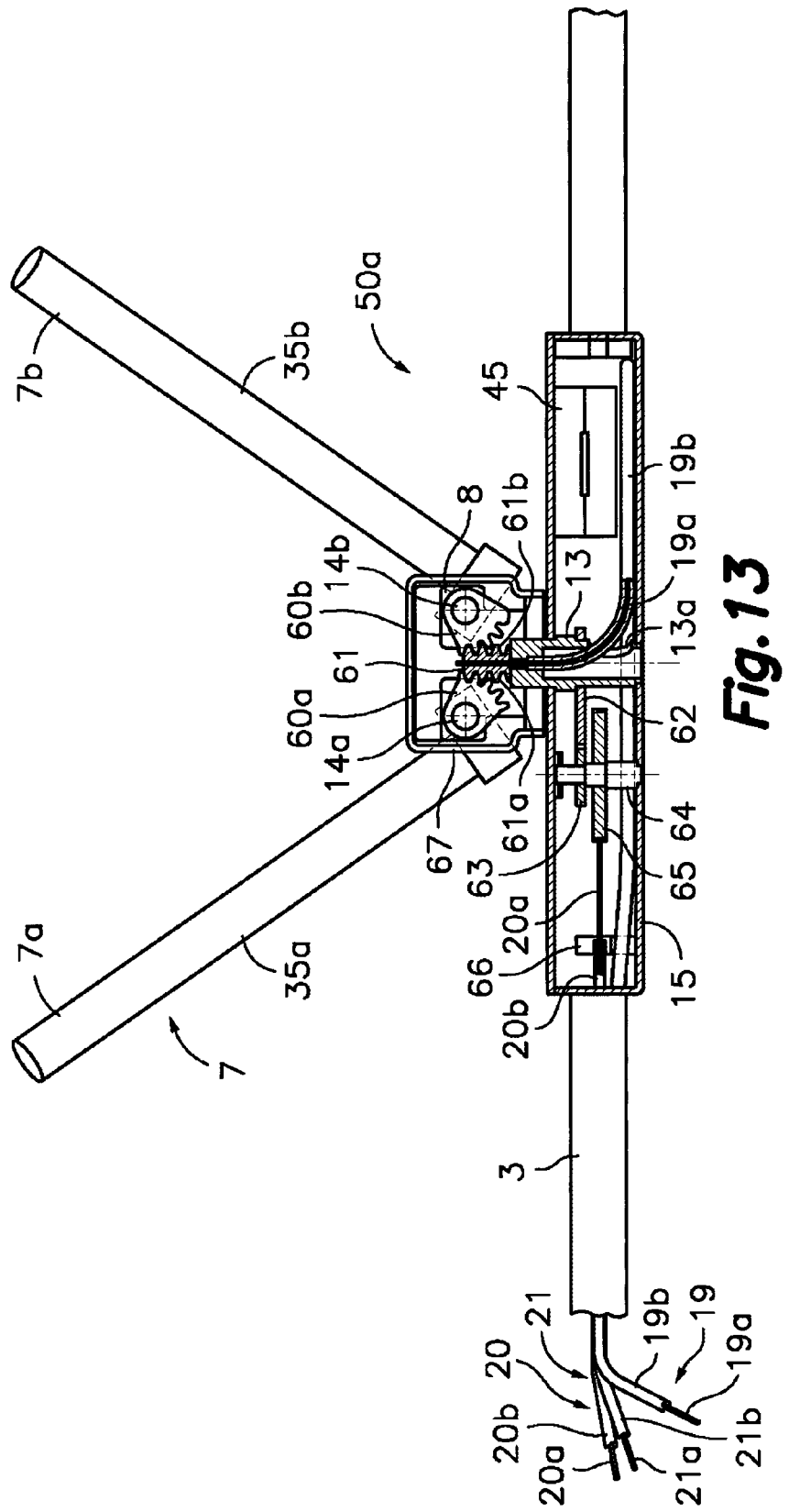
FIG. 13 is a front view of the control unit according to an alternative embodiment, with some parts sectioned, where the command member is in an inactive position corresponding to the lifted position of the steering wheel of the steering unit shown in FIG. 5 or in FIG. 11.
Figure 14:
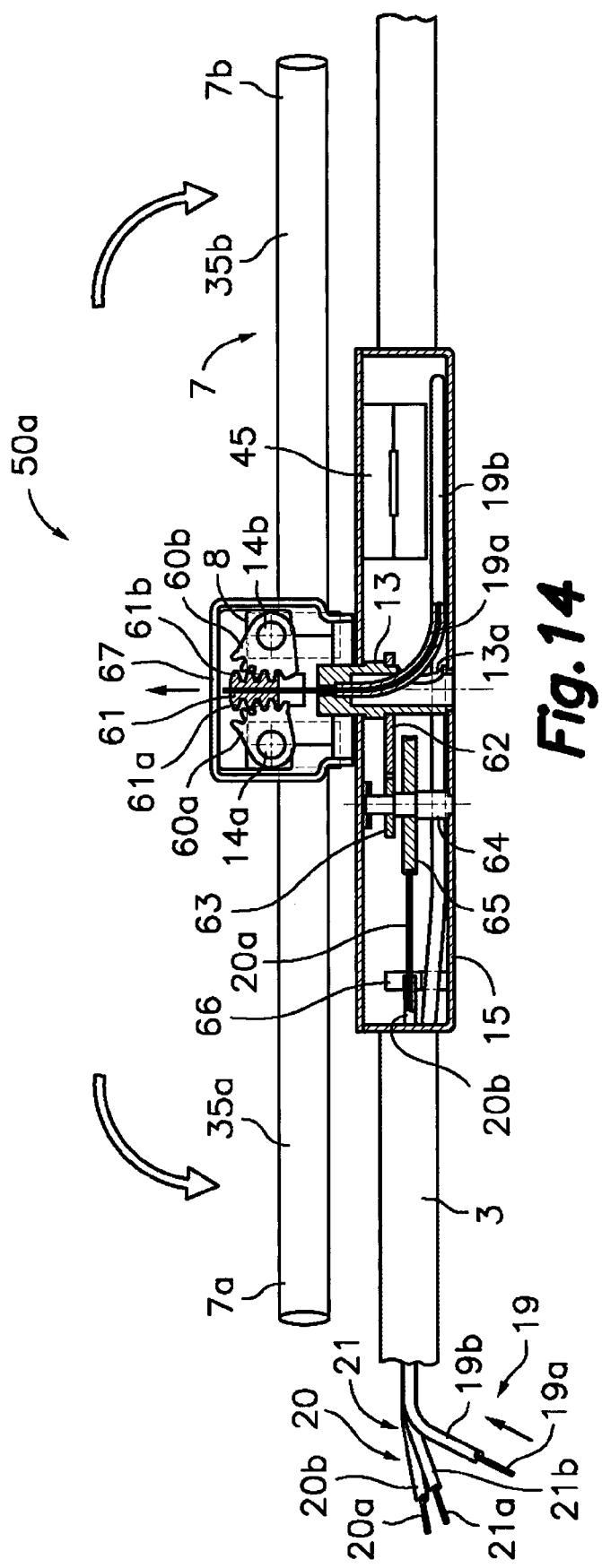
FIG. 14 is a front view of the control unit of FIG. 13, with some parts sectioned, where the command member is in an active position corresponding to the lowered position of the steering wheel of the steering unit shown in FIG. 6 or in FIG. 12.

Thus, this first part of the lowering mechanism transforms rotations in opposite directions of the lowering control shafts 14a, 14b into an axial movement of the cable 19a of the first movement transmission device 19. The coil spring 10 (FIGS. 5 and 6) or the coil springs 18 (FIGS. 11 and 12) providing the first elastic means in the steering unit 50b pull on the cable 19 and push the two elongated rigid bodies 35a, 35b forming the command member 7 towards the lifted position (FIG. 13). Optionally, an additional spring (not shown) is arranged to push the traction element 61 downwards.

It will be understood that in the embodiment shown in FIGS. 13 to 16 the command member 7 could alternatively comprise only one elongated rigid body connected to a single lowering control shaft fixed to a single gear wheel sector meshed with a single rack fixed to the first end of the cable with an equivalent result.

The first part of the steering mechanism of the alternative embodiment shown in FIGS. 13 to 16 comprises a second gear wheel sector 62 fixed to the steering control shaft 13 and meshed with a pinion 63 fixed to an auxiliary shaft 64 parallel to the steering control shaft 13. A pulley 65 is fixed to said auxiliary shaft 64, and first ends of the cables 20a, 21a of the second movement transmission device 20, 21 are fixed on said pulley 65, whereas the corresponding sheaths 20b, 21b are retained in a stop wall 66 fixed with respect to the first base body 15 of the control unit 50a. Thus, this first part of the steering mechanism transforms rotations of the steering control support 8 together with the steering control shaft 13 into axial movements of the cables 20a, 21a of the second movement transmission device 20, 21.

The embodiment with gear wheel sector 62 meshed with a pinion 63 providing a de-multiplying effect can be substituted with a pulley 65 directly fixed to the steering control shaft 13, by an adequate selection of the diameter of said pulley 65 and pulley 34 fixed to the wheel support 5 to rotate together with the wheel support 5 about the steer shaft 12.

In the alternative embodiment of the guiding member 7 shown in FIGS. 13 to 16, the incorporation of a coin-operated locking device 45 operatively housed in said first base body 15 of the control unit 50*a* (FIGS. 13 and 14) has also foreseen.

Figure 17:
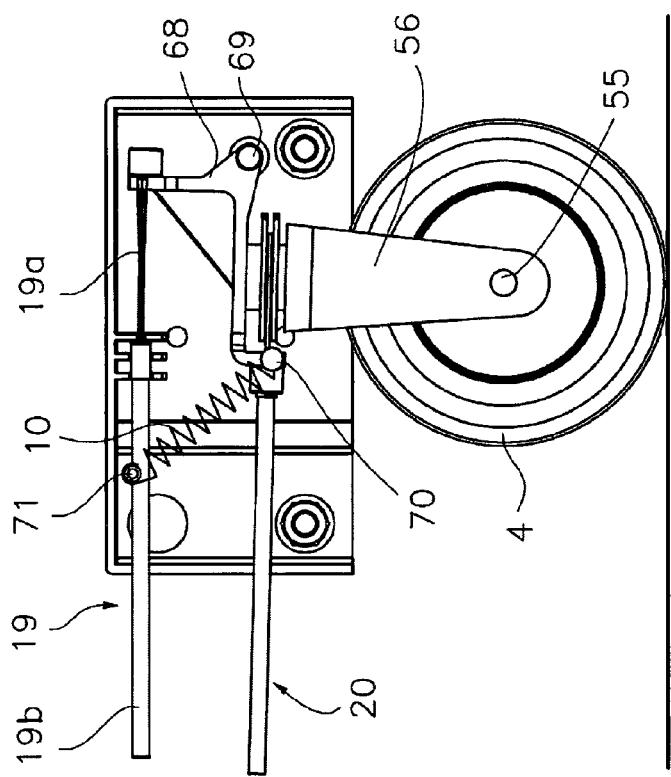
FIGS. 17 and 18 are cross sectional views of the steering units of an alternative embodiment to the one depictures in FIGS. 5 and 6.
Figure 18:
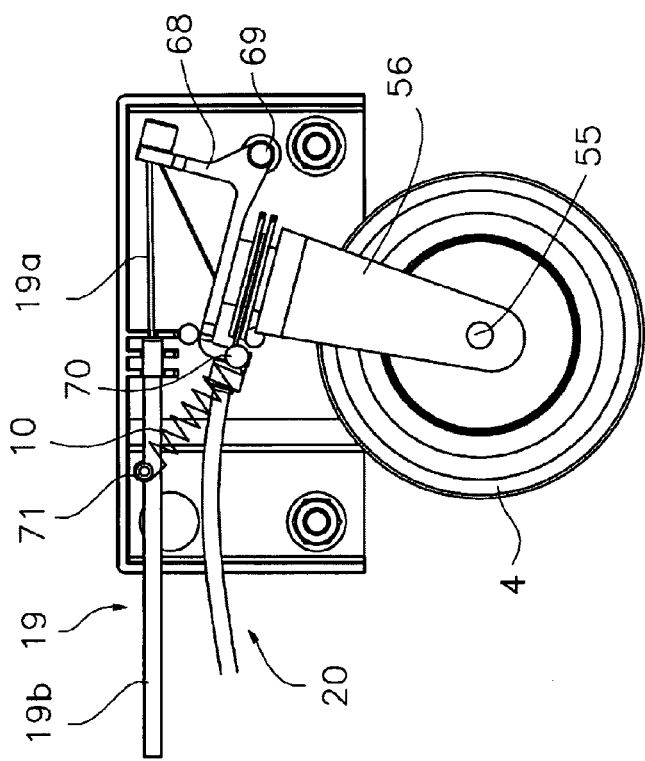

FIGS. 17 and 18 show and alternative embodiment of the lowering mechanism arranged in the steering unit 50*b* capable of transforming the mentioned axial movement of the cable 19*a* of the first movement transmission device 19, caused by an action of the first part of the lowering mechanism arranged in the control unit 50*a* (FIG. 4) into a pivoting movement of the rocker support 6 about the rocking shaft 69 to take the wheel support 5 to the lowered position, in which the steering wheel 4 is in contact with the ground, against the force of the first elastic means 10 (FIG. 17). In this alternative embodiment when the wheel is not contacting with the ground is shifted to the rear, instead of advanced as in FIG. 5. This is obtained thanks to an L-shaped lever 68 pivoted on rocking shaft 69 and linked by one end to a spring 10 and attached to the other end by cable 19*a*. Spring 10 is extended between retaining lugs 70 and 71 as seen in the Figs.

A person skilled in the art will be able to make modifications and variations from the embodiments shown and described without departing from the scope of the present invention as it is defined in the attached claims.

The invention claimed is:

1. A steering assembly for a human-driven vehicle, said vehicle having a chassis (1) mounted on a plurality of freely rotating wheels, wherein at least two of said freely rotating wheels are self-orienting wheels (2) located in an end region of the chassis (1), said steering assembly comprising:

a steering wheel (4) installed on a wheel support (5) in the same end region of the chassis (1) as at least two self-orienting wheels (2);

a manually operable lowering mechanism for moving said wheel support (5) between a lifted position, in which said steering wheel (4) is out of contact with the ground, and a lowered position, in which the steering wheel (4) is in contact with the ground; and a manually operable steering mechanism for making the wheel support (5) and the steering wheel (4) rotate with respect to a steer shaft (12);

first elastic means arranged to pull the wheel support (5) towards said lifted position;

a common command member (7) for said lowering mechanism and said steering mechanism, which can be manually operated to move the wheel support (5) towards the lowered position against a force of exerted by said first elastic means and to rotate the wheel support (5) with respect to said steer shaft (12); and a first movement transmission device (19) arranged to transmit lowering movements from the command member (7) to the wheel support (5) and a second movement transmission devices (20, 21) is arranged to transmit steering movements from the command member (7) to the wheel support (5), characterized in that said command member (7) is located in a first end region (1*a*) of the chassis (1) and the wheel support (5) with the steering wheel (4) is located in a second end region (1*b*) of the chassis (1) opposite to said first end region (1*a*);

the lowering and steering mechanisms comprises a first part connected to said command member (7) in said first end region (1 a) of the chassis (1) and a second part connected to the wheel support (5) in said second end region (1*b*) of the chassis (1), and said first and second movement transmission devices (19, 20, 21) transmit movements from said first parts of the lowering and steering mechanisms connected to the command member (7) to said second parts of the lowering and steering mechanisms connected to the wheel support (5); and the first parts of the lowering and steering mechanisms are integrated in a control unit (50a) configured to be fixed to a push member (3) connected to the chassis (1) or to the chassis (1) in a position adjacent to said push member (3) in the first end region (1*a*), and the wheel support (5) with the steering wheel (4) and the second parts of the lowering and steering mechanisms are integrated in a steering unit (50b) configured to be fixed to the chassis (1) in the second end region (1*b*).

2. The assembly according to claim 1, characterized in that:

the command member (7) can be manually pivoted with respect to a substantially horizontal lowering control shaft (14, 14*a*, 14*b*) and with respect to a substantially vertical steering control shaft (13);

the first part of the lowering mechanism integrated in the control unit (50*a*) is configured and arranged to transform a rotation of the command member (7) with respect to said lowering control shaft (14, 14*a*, 14*b*) into an axial movement of a cable (19*a*) of said first movement transmission device (19), and the second part of the lowering mechanism integrated in the steering unit (50*b*) is configured and arranged to transform said axial movement of said cable (19*a*) of the first movement transmission device (19) into a movement of the wheel support (5) towards said lowered position against the force of the first elastic means; and the first part of the steering mechanism integrated in the control unit (50*a*) is configured and arranged to transform rotations of the command member (7) with respect to said steering control shaft (13) into axial movements of cables (20*a*, 21*a*) of said second movement transmission device (20, 21), and the second part of the steering mechanism integrated in the steering unit (50*b*) is configured and arranged to transform said axial movements of said cables (20*a*, 21*a*) of the second movement transmission device (20, 21) into rotations of the wheel support (5) with respect to said steer shaft (12) to thus vary the orientation of the steering wheel (4) and steer the vehicle.

3. The assembly according to claim 2, characterized in that the command member (7) comprises at least one elongated rigid body (35*a*, 35*b*) having a distal end with a grip (7*a*, 7*b*) and a proximal end fixed to a lowering control shaft (14*a*, 14*b*) which is substantially horizontal and substantially perpendicular to the longitudinal direction of the elongated rigid body (35*a*, 35*b*), said lowering control shaft (14*a*, 14*b*) is supported on a steering control support (8) fixed to a substantially vertical steering control shaft (13) such that the lowering control shaft (14*a*, 14*b*) can rotate about said steering control support (8), said substantially vertical steering control shaft (13) being supported on a first base body (15) of the control unit (50*a*) such that the substantially vertical steering control shaft (13) can rotate about said first base body (15) and said first base body (15) is configured to be fixed to said, push member (3) or to the chassis (1).

4. The assembly according to claim 3, characterized in that said first part of the lowering mechanism comprises at least one first gear wheel sector (60*a*, 60*b*) fixed to the lowering control shaft (14*a*, 14*b*) and meshed with a rack (61*a*, 61*b*) fixed to a first end of said cable (19*a*) of the first movement transmission device (19), and said first part of the steering mechanism comprises a second gear wheel sector (62) fixed to the steering control shaft (13) and meshed with a pinion (63) fixed to an auxiliary shaft (64), and a pulley (65) fixed to said auxiliary shaft (64) and on which there are fixed first ends of the cables (20*a*, 21*a*) of the second movement transmission device (20, 21) are fixed to said pulley (65).

5. The assembly according to claim 2, characterized in that the command member (7) comprises an elongated rigid body (35) having opposite ends with a pair of grips (7*a*, 7*b*) and an intermediate portion fixed to a steering control support (8) mounted such that it can rotate with respect to a substantially vertical steering control shaft (13) supported in a lowering control support (9), said lowering control support (9) is mounted rotatable with respect to a lowering control shaft (14) which is substantially horizontal and substantially parallel to the longitudinal direction of the elongated rigid body (35), said lowering control shaft (14) is supported in a first base body (15) of the control unit (50*a*), and said first base body (15) is configured to be fixed to said push member (3) or to the chassis (1).

6. The assembly according to claim 5, characterized in that said first part of the lowering mechanism comprises at least one lowering lever (23) mounted to rotate with respect to a pin (24) supported on the first base body (15) of the control unit (50*a*), said lowering lever (23) has a portion linked to the lowering control support (9) to be moved and another portion connected to a first end of said cable (19*a*) of the first movement transmission device (19), and said first part of the steering mechanism comprises a steering lever (36) mounted to rotate with respect to a shaft (37) supported in the lowering control support (9) of the control unit (50*a*), wherein said steering lever (36) has a first gear wheel sector (38) concentric with said shaft (37) and meshed with a second gear wheel sector (39) formed in the steering control support (8) and concentric with the steering control shaft (13), and is connected to first ends of the cables (20*a*, 21*a*) of the second movement transmission device (20, 21).

7. The assembly according to claim 1, characterized in that said second part of the lowering mechanism comprises a rocker support (6) mounted pivotable with respect to a substantially horizontal rocking shaft (16) supported on a second base body (17) of the steering unit (50*b*) configured to be fixed to the chassis (1), said steer shaft (12) with respect to which the wheel support (5) can rotate is supported on said rocker support (6), and an articulated arm (28, 30) linked to said second base body (17) and to the rocker support (6) is connected to a second end of said cable (19*a*) of the first movement transmission device (19), and said second part of the steering mechanism comprises a pulley (34) mounted to rotate together with the wheel support (5) about the steer shaft (12), wherein said pulley (34) has fixed thereto second ends of the cables (20*a*, 21*a*) of the second movement transmission device (20, 21).

8. The assembly according to claim 7, characterized in that the first elastic means comprise at least one coil spring (10) arranged between the rocker support (6) and said second base body (17) of the steering unit (50*b*).

9. The assembly according to claim 1, characterized in that said second part of the lowering mechanism comprises a shaft support (40) supported in a second base body (17) of the steering unit (50*b*) configured to be fixed to the chassis (1), the steer shaft (12) to which the wheel support (5) is fixed is supported such that the wheel support can rotate and slide axially with respect to said shaft support (40) between the lifted and lowered positions, and a second end of said cable (19*a*) of the first movement transmission device (19) is connected to at least one cam (43) mounted in the second base body (17) and arranged to press the wheel support (5) towards the lowered position, and said second part of the steering mechanism comprises a pulley (34) mounted on the shaft support (40) such that the pulley (34) can rotate about but not slide in parallel to the steer shaft (12), and at least one drive rod (41) parallel to the steer shaft (12) is fixed to the wheel support (5) and slidingly inserted in a hole (42) formed in said pulley (34), wherein said pulley (34) has fixed thereto second ends of the cables (20*a*, 21*a*) of the second movement transmission device (20, 21) and wherein said drive rod (41) transmits the rotations of the pulley (34) to the wheel support (5).

10. The assembly according to claim 9, characterized in that the first elastic means comprise at least one coil spring (18) arranged around said drive rod (41) between a stop (41*a*) joined to the end of the drive rod (41) and the pulley (34).

11. The assembly according to claim 1, characterized in that said first and second movement transmission devices (19, 20, 21) comprise flexible cable and sheath assemblies (19*a*, 19*b*; 20*a*, 20*b*; 21*a*, 21*b*).

12. The assembly according to claim 1, characterized in that a coin-operated locking device (45) is operatively housed in a first base body (15) of said control unit (50*a*) to allow the immobilization of the vehicle with respect to another vehicle with a similar coin-operated locking device, or with respect to an anchoring point fixed in relation to the ground.

13. A kit to be incorporated to pre-existing vehicles comprising at least a steering assembly according to claim 1.

\* \* \* \* \*